US011985973B2

(12) United States Patent
Thompson et al.

(10) Patent No.: US 11,985,973 B2
(45) Date of Patent: May 21, 2024

(54) INSECT REPELLING COMPOSITION

(71) Applicant: GLOBAL BIOLIFE INC., Bethesda, MD (US)

(72) Inventors: Daryl L. Thompson, Winter Haven, FL (US); Thomas A. Meyer, St. Louis, MO (US); Nicholas A. Van Rees, Kirkwood, MO (US)

(73) Assignee: Global Biolife Inc., Bethesda, MD (US)

( * ) Notice: Subject to any disclaimer, the term of this patent is extended or adjusted under 35 U.S.C. 154(b) by 0 days.

(21) Appl. No.: 17/671,172

(22) Filed: Feb. 14, 2022

(65) Prior Publication Data
US 2022/0159950 A1 May 26, 2022

Related U.S. Application Data

(63) Continuation of application No. 16/270,857, filed on Feb. 8, 2019, now Pat. No. 11,246,310.

(51) Int. Cl.
| *A01N 27/00* | (2006.01) |
| *A01N 25/02* | (2006.01) |
| *A01N 31/02* | (2006.01) |
| *A01N 31/06* | (2006.01) |
| *A01N 31/08* | (2006.01) |
| *A01N 35/04* | (2006.01) |
| *A01N 37/06* | (2006.01) |
| *A01N 37/40* | (2006.01) |

(52) U.S. Cl.
CPC ............ *A01N 27/00* (2013.01); *A01N 25/02* (2013.01); *A01N 31/02* (2013.01); *A01N 31/06* (2013.01); *A01N 31/08* (2013.01); *A01N 35/04* (2013.01); *A01N 37/06* (2013.01); *A01N 37/40* (2013.01)

(58) Field of Classification Search
CPC ........ A01N 27/00; A01N 25/02; A01N 31/06; A01N 31/08; A01N 35/04; A01N 37/06; A01N 37/40
See application file for complete search history.

(56) References Cited

U.S. PATENT DOCUMENTS

| 5,121,708 A | * | 6/1992 | Nuttle | A23K 10/30 |
| | | | | 47/1.4 |
| 7,252,845 B2 | * | 8/2007 | Weidner | A61K 8/9794 |
| | | | | 424/773 |
| 2002/0082279 A1 | * | 6/2002 | Schultz | A61P 25/04 |
| | | | | 514/330 |
| 2008/0020078 A1 | | 1/2008 | Enan | |
| 2014/0220164 A1 | * | 8/2014 | Manhas | A01N 25/02 |
| | | | | 424/754 |
| 2014/0322159 A1 | * | 10/2014 | Ray | A01N 41/12 |
| | | | | 514/315 |
| 2017/0094963 A1 | | 4/2017 | Enan | |
| 2019/0307719 A1 | * | 10/2019 | Karelis | A61K 36/54 |

FOREIGN PATENT DOCUMENTS

| JP | 2003201203 | 7/2003 |
| JP | 4440580 | 3/2010 |

OTHER PUBLICATIONS

First Examination Report dated Feb. 16, 2023 in Indian Application No. 202117035955.
Pohlit, Adrian, et al, "Patent Literature on Mosquito Repellent Inventions which Contain Plant Essential Oils—A Review", Plant A Medica, vol. 77, No. 06, Apr. 1, 2011, pp. 598-617.

* cited by examiner

*Primary Examiner* — Jared Barsky
(74) *Attorney, Agent, or Firm* — Stephen J. Weyer, Esq.; Stites & Harbison, PLLC

(57) ABSTRACT

A composition and method for insect repellent is provided. The composition in one form has on a weight percentage basis 2-4% α-pinene; 2-4% borneol; 8-10% geraniol; 28-35% linalool; 25-38% linalyl acetate; 1-4% methyl salicylate; 2-4% myrcene; 2-4% para-cymene; 4-8% phellandrene; 1-4% thymol; and 2-4% vanillin. The composition has insect repellent properties.

3 Claims, No Drawings

INSECT REPELLING COMPOSITION

FIELD OF THE INVENTION

The present invention relates to a composition for repelling insects and in particular a composition comprising various constituents in a formulation that has insect repelling properties.

BACKGROUND OF THE INVENTION

Insects provide valuable functions including but not limited to pollination of plants, being a food source and other positive roles. However, some insects have undesirable effects which include but are not limited to carrying and transferring diseases as well as being nuisances, e.g., insects that bite. For example, ticks and mosquitos carry diseases that affect animals and humans.

Mosquitoes are responsible for most human illnesses with an average 500 million cases resulting in three million deaths annually. Ninety percent of these cases occur in Africa alone with 2.5 billion at risk globally. Women are particularly at risk due to the increased attractiveness to predatory mosquitoes due to the increased alkalinity of their skin. Another key factor in increased risk to women is that they are generally less likely to use traditional mosquito repellent technologies such as DEET due to perceived toxicity and dislike of its greasy sensation on skin.

Further, mosquito bone diseases are one of the most deadly threats to the human population. The strategies for the prevention of mosquito vectored dieses must be discovered as risk of these diseases will incrementally increase as natural occurrence of mosquito habitat spreads due to global warming. Presently there is a global population of approximately 10 million species on insects. Of those it has been determined that 10,000 of those actively feed on blood and the amount of those that feed on humans would number around 100. The insects that prey on humans are required to deploy an array of sensitive chemoreceptor networks that work in specific coordination to locate prey.

Currently today the best strategies that exist for mosquito protection for humans is DEET, IR3535 and Picaridin. Although these chemicals are effective they lack serious limitations that the following invention seeks to solve. DEET, IR3535, Picaridin are effective in that they stimulate a key receptor of the mosquitoes chemosensory array to illicit a repellent response. This primary receptor is called the Or47a and Or83b DEET-Like receptor. Affecting this receptor by use of DEET, IR3535, or Picaridin proves to be its own limitation in which it which it only affects this receptor. This strategy only serves to create single method in which to repel mosquitoes or predatory insects. The mosquito can still relay on other chemosensory receptors to locate prey which makes the DEET receptor ineffective.

It has been universally recognized that the use of botanical extracts to repel mosquitoes have met with limitation due to the toxic effects of some of the chemicals that they contain. The toxic effects of most mosquito repelling fragrances or oils have limited effectiveness due to the other toxic chemicals present in them. The following is a list of examples of popular mosquito repelling fragrances/oils and their toxic effects; anise (*Pimpinella anisum*) carcinogenic due to methyl eugenol, basil (*Ocimum* sp) carcinogenic due to methyl eugenol, bergamot (*Citrus bergamia*) phototoxic skin irritant due to d-limonene, cajeput (*Melaleuca alternifolia*) phototoxic skin irritant due to methyl eugenol, citronella (*Cymbopogon nardus*) skin irritant due to methyl eugenol and citral, citrus oil (*Citrus sp*) phototoxic skin irritant due to bergapten and d-limonene, clove (*Syzygium aromaticum*) skin irritant due to methyl eugenol, lemon bush (*Lippia javanica*) skin irritant due to citral, geranium (*Pelargonium graveolens*) skin irritant due to citral, ginger (*Zinziber* sp) skin irritant due to citral, huon (*Langarostrobus franklini*) skin irritant due to methyl eugenol, lemongrass (*Cympogon cintratus*) skin irritant due to citral, lime (*Citrus aurantifolia*) phototoxic skin irritant due to d-limonene, litsea (*Litsea* cubebia) skin irritant due to citral, marigold (*Tagates minuta*) phototoxic, wormseed (*Chenopodium ambrosiodes*) liver toxicity, mint (*Mentha piperata*) skin irritant due to trans-2-hexanol, nutmeg (*Myristica fragrans*) skin irritant due to methyl eugenol, palmarosa (*Cymbopogon martini*) carcinogenic due to methyl farnesol, pennyroyal (*Menthyl pulegium*) toxic, pine (*Pinus sylvestris*) phototoxic, rosemary (*Rosemarinus officinalis*) skin irritant due to methyl eugenol, rue (*Ruta chalepensis*) phototoxic due to psoralene, thyme (*Thymus vulgaris*) skin irritant due to trans-2-hexanol, violet (*Viola odorata*) skin irritant due to trans-2-hexanol.

SUMMARY OF THE INVENTION

The present invention relates to various compositions which are formulations of or comprising several constituents. Some of the constituents are found in botanical plants. Further, some of the components or constituents are fragrances produced by plants and such plants may have a multitude of other chemicals that have properties which may or may not have insect repellent characteristics. These include chemo-sensory signaling for defense, attractants, would healing, etc. An improved mosquito relent may be potentiated by formulation of a repellent that only incorporates the insect repellent active chemicals from a vast array of mosquito repellent fragrances. Such a formulation would be superior in that it would contain key chemical chemosensory inhibitors to inhibit the Or47a and Or83b DEET receptor, the AgOr65 protein receptor, the cpA carbon dioxide receptor, and the AeegOr4 or AaegOr103 sulcatone human specific receptor. The formulation may be realized by critical analysis and extrapolation of these specific chemoreceptor specific compounds of all botanical fragrances that are known to have mosquito or insect repellent properties.

In addition to superior insect repellent properties, formulations of the present composition are safe for humans and animals.

Some formulations of the present invention are directed to a more useful strategy would be a complex formulation that can inhibit ALL of the mosquitoes chemosensory package. This would include the AgOr65 protein receptor, the cpA carbon dioxide receptor and the AaegOr4 or Aaeg103 receptor that's senses sulcatone which is uniquely emitted by human hosts.

The present invention, in one form, relates to a composition, on a weight percentage basis as follows:
 2-4% α-pinene,
 2-4% borneol,
 8-10% geraniol,
 28-35% linalool,
 25-38% linalyl acetate,
 1-4% methyl salicylate,
 2-4% myrcene,
 2-4% para-cymene, 4-8% phellandrene,
1-4% thymol and
2-4% vanillin.

The present invention in another form thereof relates to a composition that comprises, in weight percent:
1-2% delta-3-carene,
12-20% ocimene,
50-60% alpha-farnesene,
2-5% linalool,
5-10% methyl salicylate,
1-2% alpha pinene,
2-6% sabinene, and
3-7% opopanax oil.

The present invention, in another form thereof, relates to a method for repelling insects using a composition, on a weight percentage basis as follows:
2-4% α-pinene,
2-4% borneol,
8-10% geraniol,
28-35% linalool,
25-38% linalyl acetate,
1-4% methyl salicylate,
2-4% myrcene,
2-4% para-cymene,
4-8% phellandrene,
1-4% thymol and
2-4% vanillin.

In still another form thereof, a method for repelling insects includes deploying a composition comprising, on a weight percent basis as follows:
1-2% delta-3-carene,
12-20% ocimene,
50-60% alpha-farnesene,
2-5% linalool,
5-10% methyl salicylate,
1-2% alpha pinene,
2-6% sabinene, and
3-7% opopanax oil.

The composition can be formulated as a solid, a liquid such as an oil or a lotion, etc. The composition can be deployed by topically applying the composition to an individual (human or animal), spraying the composition on the individual or in an environment in which one wishes to repel insects, burning the composition, etc.

Advantages of the present composition and method include but are not limited to a more effective insect including mosquito repellent than conventional compositions and a composition which is safer and has less negative effects as other conventional insect repellents which include but are not limited to DEET.

DETAILED DESCRIPTION

The present composition functions as a repellent of insects including mosquitoes. The mechanism by which the present invention operates varies depending on the specific constituents in the composition. The composition includes constituents such as fragrances that act on an insect's olfactory sensory neurons. Other constituents in the present composition affect an insect's other senses.

In one preferable formulation, the present composition achieves a superior insect repellent that focuses on repellent factors while avoiding limitations of toxicity to humans, animals or other living things including plants to which one wishes to repel insects.

Referring specifically to how various formulations of the present composition affect insects and in particular mosquitoes, each mosquito olfactory sensory neuron expresses one odorant receptor which recognizes specific structural features or epitopes in odorant molecules. Axons of neurons expressing the same receptor converge onto a single glomerus. Therefore a given odorant may have structural features that are recognized by odorant receptors Or83b, Or47a, Or4, Or103, and cpA that activate the corresponding glomeruli. Another odorant may have different epitopes and may activate alternate receptors. A third type of odorants may have completely different epitopes and activate several receptors simultaneously. Therefore, an odorant receptor and its corresponding glomerulus can be activated by several different odorants, but each odorant is likely to elicit a unique pattern of glomeruli activation. This pattern constitutes an odorant specific neural pattern that the mosquito utilizes to find prey.

One aspect of the present composition focuses on specific components or constituents that inhibit these olfactory receptors either specifically or universally to effectively "blind" the insect (e.g., mosquito) to human prey. This strategy allows one to select specific constituents and respective concentrations for inclusion in formulations of the present composition sufficient to produce an insect repellent that is superior to that of DEET, IR3535, or picaridin which only affect singular receptors.

Fragrant oils such as citronella, rosemary, and eucalyptus have been used for to repel insects for thousands of years. These fragrant oils are comprised on VOC (volatile organic compounds) produced by flowers and fruit. These oils are collected as extracts from their respective sources and are technically described as an accord. An accord is a suite of chemicals that are grouped together to create a specific odor. These accords may be duplicated to by perfumers to create specific fragrances and are comprised of a top, middle and base note. The volatility of these components are highest with the top note, somewhat volatile with the middle note and least volatile with the base note.

In the case of citronella, an oil found in many botanical sources and known for its repellent activity was determined to be comprised of several mixtures of oils. It was discovered that the accord that makes up the fragrance is comprised of sub-oils that have repellent factors and other sub oils that do are not repellent.

For instance citronella is of 18-20% geraniol, limonene 9-11%, methylisoeugenol 7-11%, citronellol 6-8%, citronellal 5-15%. It is interesting to point out that only the geraniol, limonene, and citronella oils have mosquito repellent properties while the remaining oils in the accord are for other purposes such as defense or attractants.

This is also the same for eucalyptus oil that is comprised of 60-80% cineole oil with the remaining 40-20% being trace oils. The remaining trace oils are alpha-pinene 9%, beta-pinene 1.5%, alpha pellandrene 1.5%, delta limonene 12%, 1,8 cineole 70%, camphor 0.1%, and sabinene, 0.3%.

Research conducted shows that fragrant accorded in most insect (e.g., mosquito) repelling oils are only partially responsible for repelling insects with the remainder of the fragrant oils utilized as an attractant for pollinating insects or acting to signal health characteristics such as defense pheromones to nearby plants of similar species.

For instance the fragrant aroma of the common tomato plant is an excellent example. The leaves cellular structure are comprised of glandular trichomes that contain crystals and oils in there bulbous sections. These structures contain oils that are responsible for several biological functions including plant defense. The tomato leaf chemical constituents are tomatine, (Z)-3-hexenal, (E)-2-hexenal, eugenol, 1,8 cineole, caryophyllene, b-phellandrene, humulene, linalool. Each chemical of the tomato has either a specific function or synergistic function. As with the case of the fragrance of tomato, through research it was determined that tomatine is an anti-membrane defense chemical that is used to prevent biofilm formation of attacking snails, bacteria, or fungi. (Z)-hexenal is involved with wound healing as it possesses anti-microbial capability by inhibiting JA signaling of invading bacteria and fungi. (E)-2-hexenal, although similar to (Z)-3-hexenal, acts as an attractant for beneficial predatory insects. The chemical b-phellandrene is a chemical attractant known for luring caterpillar predatory mites to the site of injury. This leaves the chemicals eugenol, 1,8 cineole, caryophyllene, humulene, and linalool as the sole chemicals of the tomato fragrant accord responsible for repelling insects.

Another key drawback with the use of natural botanical extracts of plants with known mosquito repelling properties is that is that some of the chemical constituents that make up the accord are actual chemical attractants for mosquitoes. This can be clearly seen in the chemical accord of the well-known mosquito repelling extract, cedar oil that contain cedrol, isolongifolene, and dehydroneolingifolene. It is well recognized that the replication cycle of mosquito borne disease is one of the largest biological threats to mankind. All of the viruses that affect man share a unique but similar cycle. A good example would be the malaria infection cycle. The cycle begins with a malaria infected mosquito biting and infecting a human host. The malaria parasite then grows and waits in the human host for the next mosquito to bite the host. The parasite then travels form the host to the mosquito where it now becomes infected as well. The cycle repeats with the malaria parasite traveling between the two human and mosquito hosts. It is important discuss that the malaria parasite has evolved to emit a chemical signal that "messages" the mosquito to come and pick up the parasite. While nearing maturity inside the human host, the parasite will begin to emit chemical signatures that attract the mosquitoes to the infected human host. Many of these same chemical signatures are found in common botanical extracts that are used to repel mosquitoes.

In accordance with another aspect of the present composition, the composition can be formulated to make an individual to which the composition is applied "blind" to insects such as but not limited to mosquitos or other biting insects, by inhibiting the protein receptors that detect body odors in humans or animals. These specialized receptors detect specific proteins of body odors emitted by humans. These odors are sulcatone and lactic acid. The mosquito antennae have specialized receptors (AaegOr4, AaegOr65, and AaegOr103) that detect human body odors sucratone and lactic acid that are specific in locating human prey. All of these receptors require the function of P450 isozymes for the receptors to detect these human specific odorants. It would be an unique strategy to incorporate key chemicals into a repellent that sufficiently inhibits the function of the AaegOr4, AaegOr65, and AaegOr103 receptors. Successful deactivation of these key receptors via P450 isozyme inhibition would blind the mosquito to the presence of a human host. Accordingly, several formulations of the present composition include thymol, myrcene, bomeol, vanillin, ursolic acid, pinene, and phellandrene as mosquito repellent formulas for the purpose of blinding mosquito sucratone and lactic acid receptors by inactivation of native receptor P450 isozymes.

EXAMPLES

The following are examples of formulations and uses of the present composition.

Example 1—Rose

The rose flower (*Rosa damscena* or *Rosa centifolia*) is a prime example of this. The entire fragrance accord of the rose is comprised of 28 components. They are citronellol, geranoil, nerol, linalool, phenyl ethyl alcohol, famesol, stearoptene, a-pinene, b-pinene, a-terpinene, limonene, p-cymene, camphene, b-carophyllene, citronellyl acetate, geranyl acetate, neryl acetate, eugenol, methyl eugenol, rose oxide, a-damascenone, b-damascenone, benzyl aldehyde, benzyl alcohol, rhodinyl acetate, phenyl theyl formate, beta ionone, tatrahydrofuran.

Of the above mentioned accord only 11 of the fragrant components have mosquito repellent properties. These are citronellol, geraniol, linalool, farnesol, a-pinene, b-pinene, limonene, p-cymene, camphene, citronellyl acetate, geranyl acetate. The remaining 17 components; nerol, phenyl ethyl alcohol, stearoptene, a-terpinene, b-carophyllene, neryl acetate, eugenol, methyl eugenol, rose oxide, a-damascenone, b-damascenone, benzyl aldehyde, benzyl alcohol, rhodinyl acetate, phenyl ethyl formate, beta ionone, and tetrahydrofuran do not have repellent properties and are utilized as complex attracts for specific species of insects.

Further it is crucial to point out that the above 11 chemical isolates also very in effectiveness at inhibition of mosquito ORN (odorant sensory neurons) and that their concentration for effective use in formulation of a repellent would depend on their direct interaction with the mosquito cpA carbon dioxide receptor.

Example 2—Geranium

Another example would be the well recorded use of the geranium fragrance (*Pelargonium* spp.) for repelling mosquitoes. The geranium fragrant accord is comprised of 73 individual components. These are, hexanol, a-pinene, myrcene, p-cymene, limonene, y-terpinene, cis-linalool oxide, trans linalool oxide, trans rose oxide, neo isopulegol, menthone, a-terpineol, citronellol, neral, geraniol, neryl formate, citronellic acid, methyl geranate, 8-hydroxy neo menthol, a-cubene, b-bourbonene, b-elemene, I phenylethyl isobutanoate, caryophyllene, a-gurjunene, (E) caryophyllene, b-copaene, aromadendrene, citronellyl propionate, cis-muurola-3,5, diene, a-humalene, allo-aromadendrene, cis-muurola-4(14),5-diene, geranyl propanoate, a-amorphene, citronellyl isobutyrate, cis-b-guaiene, a-muurolene, lavandandulyl 2-methylbutanoate, y-cadinene, trans calamenene, citronellyl butanoate, a-calacorene, granyl butanoate, maaliol, citronellyl 2 methyl butanoate, spathulenol, caryphyllene oxide, 2-phenyl ethyl oxide, 2-phenylethyl tiglate, viridiflorol, geranyl 2 methyl butanoate, humalene epoxide II, 1,10-di-epi-cubenol, junenol, citronellyl pentanoate, 1-epi-cubenol, caryophylla-4(12),8(13)-dien-5-ol, muurolol, a-muurolol, a-cadinol, geranyl pentanoate, (E) citronellyl tiglate, 14, hydroxyl-9-epi-(E)-caryophyllene, cadelene, geranyl tiglate, geranyl ester, geranyl heptanoate, citronellyl octanoate, citronellyl ester, nona cosane.

However out of these 73 components only 42 have the potential for mosquito repellent activity. These are a-pinene, myrcene, limonene, y-terpinene, cis linalool oxide, linalool, methone, a-terpineol, citronellol, geraniol, geranyl formate, citronellic acid, carophyllene, citronellyl propionate, a-humalene, geranyl propanoate, citronellyl isobutyrate, y-cadinene, citronellyl butanoate, maaliol, citronellyl 2-methyl butanaote, spathulenol, caryphyllene oxide, geranyl 2-methyl butanoate, humulene epoxide II, citronellyl pentanoate, caryophylla-4(12),8(13)-dien-5-ol, muurolol, gemayl pentanoate, (E) citronellyl tiglate, 14-hydroxy-9-epi-(E)-caryophyllene, cadalene, geranyl tiglate, geranyl ester, geranyl heptanoate, citronellyl octanoate, citronellyl ester.

It is of further importance to demonstrate that the above mentioned 42 compounds can be further condensed into 6 primary chemical classes. These being 10 citronellyl compounds, 2 humulene compounds, 8 geranyl compounds, 8 isoprenooids, 4 caryophyllene compounds and 4 methyl/menthyl compounds. This can be clearly demonstrated as citronellyl classes comprising (citronellol, citronellic acid, citronellyl propionate, citronellyl isobutryrate, citronellyl butanoate, citronellyl, citronellyl pentanaote, (E) citronellyl tiglate, citronellyl actanoate, citronllyl ester). This is further demonstrated in the geranyl class (geraniol, geranyl formate, geranyl propanaote, geranyl 2-methyl butanoate, geranyl pentanoate, geranyl tuglate, geranyl ester, geranyl heptanoate). Further evidence of the chemical conservation can be seen in the isoprenoid class (a-pinene, myrcene, limonene, y-terpinene, cis linalool oxide, linalool, a-terpineol, y-cadinene).

Example 3—Lemongrass

Lemongrass for instance indeed has mosquito repelling properties and contains 16 chemicals in its accord; 2-citral, borneol, estragole, methyl eugenol, geranyl acetate, geraniol, beta-myrcene, limonene, piperitone, citronella, careen-2, a-terpineole, pinene, farnesol, proximadiol, cymbodiacetyl. Of these 16 chemicals only 10 have some mosquito repelling properties with only 7 out of those 10 showing efficacy over 2 hours. These are borneol, geranyl acetate, geraniol, beta-myrcene, citronellal, pinene and farnesol.

Example 4—Cedar Oil

Another imperfection to using extracts of plants that are thought to have mosquito repelling properties can be readily seen in cedar oil. Cedar oil contains 45 specific oils in its entire accord with 39 of those chemicals having mosquito or insect repelling properties. The complete accord of cedar oil is a-pinene, a-thujene, camphene, b-pinene, sabinene, myrcene, a-terpinene, limonene, b-phellandrene, y-terpinene, p-cymene, terpinolene, isolongofolene, b-cubebene, linalool, a-longipinene, a-cedrene, a-barbatene, b-cedrene, terpinen-4-ol, b-funebrene, cis-p-menth-2-en-1-ol, thujopsene, allo-aromadendrene, b-barbatene, trans-pipertol, selena-4,11-diene, b-chamigrene, a-terpineol, pseudowiddrene, bicyclogermacrene, a-cuprene, thujosadiene, cadinene, ar-curcumene, cuparene, dehydro-b-oinone, 8,9-dehydroneolongifolene, a-cedrol, widdrol, 3-thujopsanone, a-cadinol, a-cedrenal, a-bisabolol, thujopsenal, mayurone.

Of the entire cedar oil accord, only 37 have mosquito repelling properties that vary in effectiveness. These are a-pinene, a-thujene, camphene, b-pinene, sabinene, myrcene, a-terpinene, limonene, b-phellandrene, y-terpinene, p-cymene, terpinolene, b-cubebene, linalool, a-cedrene, b-cedrene, terpinen-4-ol, b-funebrene, cis-p-menth-2-en-1-ol, thujopsene, allo-aromadendrene, b-barbatene, trans-pipertol, a-terpineol, bicyclogermacrene, thujopsadiene, cadinene, ar-curcumene, cuparene, widdrol, 3-thujopsanone, a-cadinol, a-cedrenal, thujopsenal.

The remainder chemical constituents of the cedar oil accord do not repel misquotes but serve other roles such as anti-fungal, would, repel, distress signaling and insect attraction. These are a-longipinene, a-barbatene, selena-4, 11-diene, b-chamigrene, a-cuprene, b-cuprenee, dehydro-b-oinone, mayurone, and a-cedral, 8,9-dehydroneolongofolene, isolongofolene.

It should be pointed out that the cedar oil components a-cedrol, 8,9 dehydroneolongofolene, and isolongofolene are actual mosquito chemical attractants that increase the risk of malaria.

Example 5

Formula 1—The composition of Formula 1 has, on weight percentage basis the following:

| 1. | alpha pinene | 4.00% weight |
| --- | --- | --- |
| 2. | borneol | 4.00% weight |
| 3. | geraniol 60 | 8.00% weight |
| 4. | linalool | 28.00% weight |
| 5. | linalyl acetate | 28.00% weight |
| 6. | methyl salicylate | 4.00% weight |
| 7. | myrcene | 4.00% weight |
| 8. | para-cymene | 4.00% weight |
| 9. | phellandrene | 8.00% weight |
| 10. | thymol | 4.00% weight |
| 11. | vanillin | 4.00% weight |

Example 6

Formula 2—The composition of Formula 2 has, on weight percentage basis the following:

| 1. | alpha pinene | 4.00% weight |
| --- | --- | --- |
| 2. | borneol | 4.00% weight |
| 3. | geraniol | 10.00% weight |
| 4. | linalool | 30.00% weight |
| 5. | linalyl acetate | 25.00% weight |
| 6. | methyl salicylate | 3.00% weight |
| 7. | myrcene | 4.00% weight |
| 8. | para-cymene | 4.00% weight |
| 9. | phellandrene | 8.00% weight |
| 10. | thymol | 4.00% weight |
| 11. | vanillin | 4.00% weight |

Example 7

Formula 3—The composition of Formula 3 has, on weight percentage basis the following:

| 1. | alpha pinene | 2.00% weight |
| --- | --- | --- |
| 2. | borneol | 2.00% weight |
| 3. | geraniol | 10.00% weight |
| 4. | linalool | 35.00% weight |
| 5. | linalyl acetate | 38.00% weight |
| 6. | methyl salicylate | 1.00% weight |
| 7. | myrcene | 2.00% weight |
| 8. | para-cymene | 2.00% weight |
| 9. | phellandrene | 5.00% weight |
| 10. | thymol | 1.00% weight |
| 11. | vanillin | 2.00% weight |

Example 8

Formula 4—The composition of Formula 4 has, on weight percentage basis the following:

| | | |
|---|---|---|
| 1. | delta-3-carene | 0.78% weight |
| 2. | ocimene | 15.29% weight |
| 3. | alpha-farnesene | 58.07% weight |
| 4. | linalool | 4.15% weight |
| 5. | methyl salicylate | 9.95% weight |
| 6. | alpha pinene | 0.83% weight |
| 7. | sabinene | 4.62% weight |
| 8. | opopanax oil | 6.31% weight |

EXPERIMENTS

The following experiments were conducted:

Table 1 (below) demonstrates insect repellency of formulas to inhibit both landing and probing (feeding behavior)

| | Yellow Fever Mosquitoes (*Aedes aegypti*) Average Number of Landings & Probes | | | | | | | |
|---|---|---|---|---|---|---|---|---|
| | Pre-treatment Activity (time after applications) 1 hr | | Treatment Activity (time after applications) 1 hr | | Pre-treatment Activity (time after applications) 2 hr | | Treatment Activity (time after applications) 2 hr | |
| Test Substance: | Landings | Probes | Landings | Probes | Landings | Probes | Landings | Probes |
| Controls-Untreated | 6 | 6 | 8 | 7 | 5 | 4 | 6 | 5 |
| Formula 1 | 8 | 7 | 0 | 0 | 8 | 7 | 0 | 0 |
| Formula 2 | 8 | 6 | 0 | 0 | 6 | 5 | 0 | 0 |
| Formula 3 | 6 | 5 | 0 | 0 | 9 | 8 | 1 | 0 |

Table 2 (below) demonstrates the calculated repellency percentage of formulas to inhibit both landing and probing (feeding behavior)

| | Yellow Fever Mosquitoes (*Aedes aegypti*) Percent Repellency of Landings & Probes Based on Pre-Treatment Activity (negative numbers represent an increase in activity) | | | |
|---|---|---|---|---|
| | 1 hr | | 2 hr | |
| Test Substance: | Landings | Probes | Landings | Probes |
| Controls - Untreated | −25% | −27% | −33% | −13% |
| Formula 1 | 97% | 100% | 97% | 100% |
| Formula 2 | 97% | 100% | 96% | 100% |
| Formula 3 | 100% | 100% | 94% | 100% |

It will now be clear that the present composition in its various formulations provides features and advantages not found in prior insect repellents. The present composition can be formulated to have strong insect repellent properties while being safe for humans and animals.

Further, the composition can be formulated to have superior mosquito repelling properties based on its constituents including fragrances which are created by selection of active extracts that effect multiple repellent strategies of predator insects such as, but not limited to, mosquitos, lice, ticks, fleas, flies, bed bugs and mites.

Further, the present composition can be optimized by selecting the specific constituents in desired amounts to achieve a desired insect repellent property based on the desired insect to repel and based on a selected desire to protect mammals including humans and animals from insects including biting insects.

The present composition can be formulated to include specific extracts which comprise a combination of multiple fragrances of known botanicals which include but are not limited to thymol, myrcene, borneol, linalool, vanillin, p-cymene, callicarpenol, 7-a-b-nepatalactone, geraniol, linalyl acetate, ursolic acid, a-pinene, 3-carene, sabinene, b-ocimene, methyl salicylate, bergemotene, a-phellandrene, a-famesene, ethyl pyruvate and germacene.

One of ordinary skill in the art will know that various modifications can be made to the present composition which include use of derivatives which include but are not limited to citronellal, limonene, camphene, geranyl acetate, y-terpinene, menthone, terpineol, geranyl formate, citronellic acid, hydroxyneomenthol, caryophyllene, citronellyl proprionate, humulene, geranyl propanoate, citronellyl isobutyrate, y-cadinene, citronellyl butanoate, geranyl butanoate, maaliol, citronellyl 2 menthyl butanoate, humulene epoxide II, citronellyl pentanoate, caryophylla-4(12),8(13)-dien-5-ol, murrolol, gernayl pentanoate, (E) citronellyl tiglate, geranyl ester, geranyl heptanoate, citranellyl octanaote, citronellyl ester, thujene, cubebene, terpinene, terpinolene, longipinene, cedrene, terpenin-4-ol, funebrene, cis-p-methy-2-en-1-ol, thujopsene, allo-aromadendrene, piperitol, bicyclogermacrene, thujopsadiene, cadinene, ar-curcumene, cuparene, ar-curcumene, dehydroneolongifolene, widdrol, cadinol, cedrenal, bisabolol, thujopsenal.

Selection of desirable constituents for inclusion of formulations of the presented composition are based on inhibition of key insect receptors which include mosquito receptors for repelling mosquitos. This may be accomplished synergistically by inhibition of carbon dioxide receptors, body odor receptors, DEET-like receptors or Dopamine Receptors. Progressive inhibition of synaptic firing of potentials in these key receptors lead result in the insect finding the human target undesirable and causes aversion to feeding.

Further, the composition can be modified such that when applied to humans, the human is "invisible" or unappealing to insects such as mosquitos by specially selecting particular isolates comprising the fragrance linked to ultra-stimulate key receptors utilized by mosquitos or other insects to select prey.

In various forms of the present composition, the constituents work synergistically to effect known DEET receptors of an insect such as a mosquito. For example there are two specific DEET receptors Or83B and Or47a. The contemplated formula contains eugenol and linalool that are known to affect these specific receptors respectively.

In addition, the present composition can be formulated to inhibit key chemical signatures that modulate mosquito feeding behavior. Doing so would result in reducing or controlling the infection rate of malaria carried by mosquitos. It is known that the malaria parasite will cause infected individuals to "outgas" chemical attractants that attract mosquitoes (pinene and limonene). It is the object of the invention to utilize a-pinene or limonene or both as chemical "blinding agents" by over stimulating mosquito sensory receptors that detect these chemicals. Over stimulation of these key receptors will elicit an avoidance behavior of predatorial mosquitoes.

In addition, the composition can be formulated with specific chemical constituents that render an insect "blind" for sensing carbon dioxide discharge from animals and human hosts. The receptors in particular are the gr1, gr2, and gr3 "gustatory" receptors containing the cpA receptor sensory cluster. It would be contemplated that the formulations would contain ethyl pyruvate, 7-a-beta-nepatalactone, methyl salicylate either independently or in combination as gustatory inhibitors.

The composition can also be formulated to contain specific chemical isolates that "blind" insect receptors AaegOr4, AaegOr65, and AaegOr103 by deactivation or inhibition of P450 isozymes found in the receptor. Deactivation of protein specific receptors would blind the mosquito to the presence of sucratone and lactic acid odors produced by human targets. These contemplated isolates are thymol, myrcene, borneol, vanillin, ursolic acid, pinene, and phellandrene that actively deactivate the sucratone and lactic acid specific protein receptors of the mosquito by direct and passive inhibition of the receptors native neuronal P450 isozymes.

Alternatively, the present composition can be formulated to prevent malaria infection by creating a topical formulation of botanical abstracts that are toxic to malaria (*P. falciparum*) sporozoites. It is contemplated that certain chemical components of botanical extracts are toxic to malarial sporozoites and plasmodium. It is further contemplated that direct reduction of malaria infection may be accomplished as the mosquito proboscis comes into contact with these botanical extracts at the initiation of penetration of the host.

In yet another alternative, the present composition can be formulated to contain chemicals that inhibit mosquitoes from developing learned behavior to avoid the aversion causing properties of DEET. It has been proven that mosquitoes can learn behavior that bypasses and reduces the effectiveness of DEET. This learned behavior has been well identified as one of the key factors that reduce the effectiveness of DEET. It is the object of the invention that the mosquito repelling formula contain monoterpenes as a means of inhibiting loss of DEET effectiveness by tolerance learning. This would include myrcene, limonene, cymene, pinene, ocimene, germacrene, carene, farnesene and bergamotene.

The present composition can be formulated in laundry detergent, cosmetics, shampoos, soaps, fabric softeners, candle waxes, tiki torches, and outdoor aerial diffusers. Depending on the particular use, the formulation will provide for insect repellent effects.

Further, modifying the constituents in the present composition will have an effect to alter the overcall fragrant signature of the resulting composition which through routine experimentation and optimization will result in an insect repellent to perform as a repellent of a desired insect or for a particular application or use.

Finally, the present composition can be modified through its combination of constituents which comprise the composition to produce a desired fragrant note or notes. The constituents which may be modified are the active ingredients of the claimed composition which include but are not limited to thymol, myrcene, borneol, linalool, vanillin, p-cymene, callicarpenol, 7-a-b-nepatalactone, geraniol, linalyl acetate, ursolic acid, a-pinene, 3-carene, sabinene, b-ocimene, methyl salicylate, bergemotene, a-phellandrene, a-farnesene, ethyl pyruvate and germacene.

What is claimed is:

1. A composition comprises, in weight percent:
   1-2% delta-3-carene,
   12-20% ocimene,
   50-60% alpha-farnesene,
   2-5% linalool,
   5-10% methyl saticylate,
   1-2% alpha pinene,
   2-6% A sabinene, and
   3-7% opopanax oil.

2. The composition of claim 1, comprises:
   1% delta-3-carene,
   15.5% ocimene,
   58% alpha-farnesene,
   4% linalool,
   10% methyl salicylate,
   1% alpha pinene,
   4.6% sabinene, and
   6.3% opopanax oil.

3. The composition of claim 1, wherein the composition is formulated as a solution for application as a spray or mist.

* * * * *